(12) United States Patent
Chen et al.

(10) Patent No.: US 10,218,172 B2
(45) Date of Patent: Feb. 26, 2019

(54) INTEGRATED UNINTERRUPTIBLE POWER SUPPLY

(71) Applicant: VOLTRONIC POWER TECHNOLOGY CORP., Taipei City (TW)

(72) Inventors: Ming-Hsien Chen, New Taipei (TW); Juor-Ming Hsieh, Taipei (TW)

(73) Assignee: VOLTRONIC POWER TECHNOLOGY CORP., Taipei (TW)

( * ) Notice: Subject to any disclaimer, the term of this patent is extended or adjusted under 35 U.S.C. 154(b) by 83 days.

(21) Appl. No.: 15/422,879

(22) Filed: Feb. 2, 2017

(65) Prior Publication Data

US 2018/0159343 A1 Jun. 7, 2018

(30) Foreign Application Priority Data

Dec. 2, 2016 (TW) .............................. 105218481 U

(51) Int. Cl.
| | | |
|---|---|---|
| *H02J 3/01* | (2006.01) | |
| *H02J 7/00* | (2006.01) | |
| *H02J 9/06* | (2006.01) | |
| *H02M 1/42* | (2007.01) | |
| *H02M 3/335* | (2006.01) | |
| *H02M 7/537* | (2006.01) | |
| *H02M 1/00* | (2006.01) | |

(52) U.S. Cl.
CPC ..................... *H02J 3/01* (2013.01); *H02J 7/00* (2013.01); *H02J 9/062* (2013.01); *H02M 1/4225* (2013.01); *H02M 3/335* (2013.01); *H02M 7/537* (2013.01); *H02M 2001/007* (2013.01)

(58) Field of Classification Search
CPC .... H02J 3/01; H02J 7/00; H02J 9/062; H02M 1/4225; H02M 3/335; H02M 7/537; H02M 2001/007
USPC ....................................................... 307/64, 66
See application file for complete search history.

*Primary Examiner* — Hal Kaplan
(74) *Attorney, Agent, or Firm* — Li & Cai Intellectual Property (USA) Office

(57) ABSTRACT

An integrated uninterruptible power supply (UPS) includes a UPS main board coupled with a controller and a battery pack. The UPS main board includes an AC (alternating current) input, a noise filtering surge protecting high voltage circuit breaker, a high power factor correction rectifier, a DC (direct current) bus, an inverter, a high power charger, a first battery contact, a second battery contact, a DC/DC convertor and an AC output. The present disclosure integrates a noise filter, a surge protector and a high voltage circuit breaker, and integrates a high power charger in the same circuit board. Therefore, the present disclosure lowers the material and production costs of UPS products, and decreases the circuit board size. In addition, the present disclosure decreases the total harmonic distortion, the ripples of input current, and the crosstalk between circuits, and increases the input power factor, the charging efficiency and the battery life.

10 Claims, 2 Drawing Sheets

INTEGRATED UNINTERRUPTIBLE POWER SUPPLY

BACKGROUND OF THE INVENTION

1. Field of the Invention

The present disclosure relates to an uninterruptible power supply (UPS), and more particularly, to an uninterruptible power supply integrated with a high power charger (500-1000 W), a noise filter, a surge protector and a high voltage circuit breaker.

2. Description of Related Art

Most conventional UPS products include a main power supply circuit board and a constant-power battery charger circuit board, and further include circuit boards of noise filter, surge protector and high voltage circuit breaker. These extra circuit boards increase the difficulty of circuit control and cost of production of the UPS, and decrease the reliability and efficiency of the UPS. Therefore, there is still room for improvement in the design of the conventional UPS products.

SUMMARY OF THE INVENTION

The present disclosure discloses an integrated uninterruptible power supply, including a UPS main board coupled with a controller and a battery pack. The UPS main board includes an AC (alternating current) input, a noise filtering surge protecting high voltage circuit breaker, a high power factor correction rectifier, a DC (direct current) bus, an inverter, a high power charger, a first battery contact, a second battery contact, a DC/DC convertor and an AC output. The AC input is the input of the UPS main board. The noise filtering surge protecting high voltage circuit breaker is coupled with the AC input. The high power factor correction rectifier is coupled with the noise filtering surge protecting high voltage circuit breaker and outputs a DC. The DC bus has a positive terminal and a negative terminal, and is coupled with the high power factor correction rectifier to transmit the DC therefrom. The inverter is coupled with the DC bus. The high power charger (500-1000 W) has an input terminal and an output terminal, and the input terminal is coupled with the DC bus. The first battery contact is coupled with the output terminal of the high power charger and the battery pack. The second battery contact is coupled with the output terminal of the high power charger and the battery pack. The DC/DC convertor is coupled with the first battery contact and the second battery contact, and is coupled with the DC bus. The AC output is the output of the UPS main board and is coupled with the inverter. In particular, the controller controls circuits of the UPS main board, and the high power charger charges the battery pack using the DC from the high power factor correction rectifier so that the high power charger has rectification and high power factor correction functions.

The high power charger further includes a first forward-biased diode, a first forward-biased switch, a second transformer, a second forward-biased switch, a second forward-biased diode, an output diode and an output capacitor. The first forward-biased diode has a positive terminal and a negative terminal, and the positive terminal is coupled with the positive terminal of the DC bus. The first forward-biased switch has one end coupled with the negative terminal of the first forward-biased diode. The second transformer has a primary winding and a secondary winding, with one end of the primary winding coupled with the other end of the first forward-biased switch, and one end of the secondary winding coupled to the ground. The second forward-biased switch has one end coupled with the other end of the primary winding of the second transformer. The second forward-biased diode has a positive terminal coupled with the other end of the second forward-biased switch, and a negative terminal coupled with the negative terminal of the DC bus. The output diode has a positive terminal coupled with the other end of the secondary winding of the second transformer, and a negative terminal coupled with the first battery contact. The output capacitor has one end coupled with the negative terminal of the output diode, and the other end coupled to the ground.

The high power factor correction rectifier further includes a first inductor, a first rectifier, a first switch, a first diode and a second diode. The first inductor has one end coupled with the one end of the output terminal of the noise filtering surge protecting high voltage circuit breaker. The first rectifier has an input terminal and an output terminal, with one end of the input terminal coupled with the other end of the first inductor, and the other end of the input terminal coupled with the other end of the output terminal noise filtering surge protecting high voltage circuit breaker. The first switch has one end coupled with one end of the output terminal of the first rectifier, and the other end coupled with the other end of the output terminal of the first rectifier. The first diode has a positive terminal coupled with one end of the first switch, and a negative terminal coupled with the positive terminal of the DC bus. The second diode has a positive terminal coupled with the negative terminal of the DC bus, and a negative terminal coupled with the other end of the first switch.

The DC/DC converter further includes a first transformer, a second rectifier, a third inductor and a fourth inductor. The first transformer has a primary winding and a secondary winding, with one end of the primary winding coupled with the first battery contact, and a middle end of the secondary winding coupled with the second battery contact. The second rectifier has an input terminal and an output terminal, with both ends of the input terminal coupled with both ends of the secondary winding of the first transformer. The third inductor has one end coupled with one end of the output terminal of the second rectifier, and the other end coupled with the positive terminal of the DC bus. The fourth inductor has one end coupled with the other end of the output terminal of the second rectifier, and the other end coupled with the negative terminal of the DC bus.

The inverter further includes a second switch, a third switch and a second inductor. The second switch has one end coupled with the positive terminal of the DC bus. The third switch has one end coupled with the other end of the second switch, and the other end coupled with the negative terminal of the DC bus. The second inductor has one end coupled to a point where the second switch and the third switch couple together, and the other end being the output of the inverter.

The controller further includes a main control unit, a USB control unit, a main slot, an RS232 slot, a USB slot and an EPO slot. The main control unit controls circuits of the UPS main board. The USB control unit is coupled with the main control unit and controls the transmission of USB signals. The main slot is for external circuit boards, and is coupled with the main control unit. The RS232 slot is for RS232 connectors and is coupled with the USB control unit. The USB slot is for USB connectors, and is coupled with the USB control unit. The EPO slot is for EPO connectors, and is coupled with the main control unit.

The UPS main board further includes a dynamic bypass device having an input relay and an output relay. The input relay has an input terminal and an output terminal, with the input terminal coupled with the noise filtering surge protecting high voltage circuit breaker, and the output terminal coupled with the high power factor correction rectifier. The output relay has an input terminal and an output terminal, and the input terminal of the output relay has a first contact and a second contact. The first contact of the output relay is coupled with one end of the output terminal of the input relay, and the second contact of the output relay is coupled with the inverter.

The dynamic bypass device further includes an output noise filter having an input terminal and an output terminal. One end of the input terminal of the output noise filter is coupled with the output terminal of the output relay, and the other end of the input terminal of the output noise filter is coupled with the other end of the output terminal of the input relay.

The UPS main board further includes a main power supply circuit having a third forward-biased diode, a third transformer, and a third forward-biased switch. The third forward-biased diode has a positive terminal and a negative terminal, and the positive terminal is coupled with the output terminal of the high power charger. The third transformer has a primary winding and a secondary winding, with one end of the primary winding coupled with the negative terminal of the third forward-biased diode, and the secondary winding having multiple power outputs. The third forward-biased switch has one end coupled with the other end of the primary winding of the third transformer, and the other end coupled to the ground.

The UPS main board further includes an auxiliary power supply circuit having a third rectifier, a fourth transformer and a fourth forward-biased switch. The third rectifier has an input terminal and an output terminal, the input terminal coupled with the noise filtering surge protecting high voltage circuit breaker. The fourth transformer has a primary winding and a secondary winding, with one end of a primary winding coupled with one end of the output terminal of the third rectifier, and the secondary winding having multiple power outputs. The fourth forward-biased switch has one end coupled with the other end of the primary winding of the fourth transformer, and the other end coupled with the other end of the output terminal of the third rectifier.

Unlike conventional UPS products, the present disclosure does not require setting an extra circuit for high power factor correction on the circuit board of the high power battery charger. Therefore, the present disclosure lowers the material and production costs of UPS products, and decreases the size of the circuit board. In addition, the present disclosure decreases the total harmonic distortion, the ripples of input current, and the crosstalk between circuits, and increases the input power factor, the charging efficiency, and the battery life.

In order to further the understanding of the present disclosure, the following embodiments are provided along with illustrations to facilitate the disclosure of the present disclosure.

DETAILED DESCRIPTION OF THE PREFERRED EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

Figure 1:
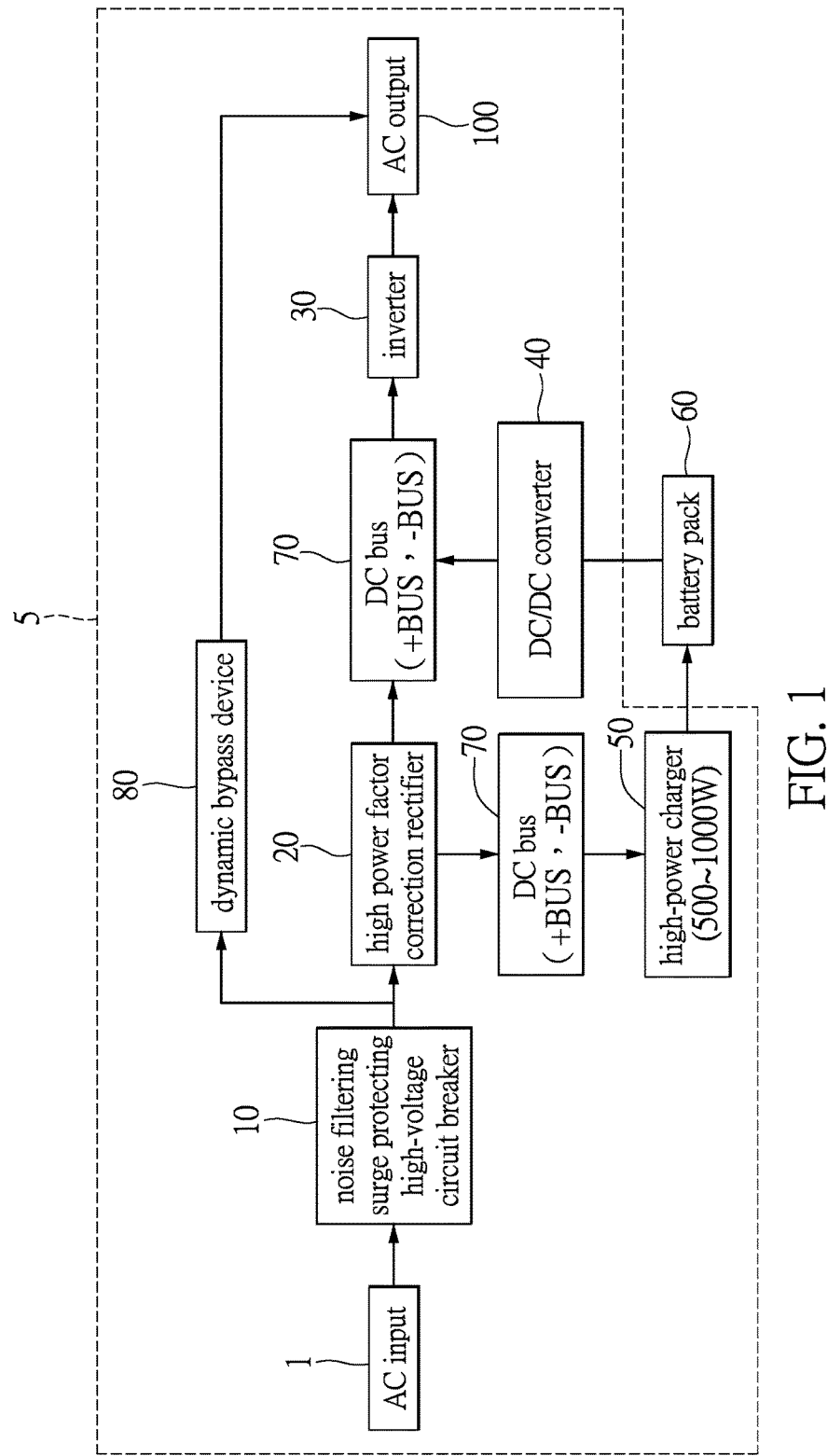
FIG. 1 shows a circuit block diagram of an integrated uninterruptible power supply according to an embodiment of the present disclosure.
Figure 2:
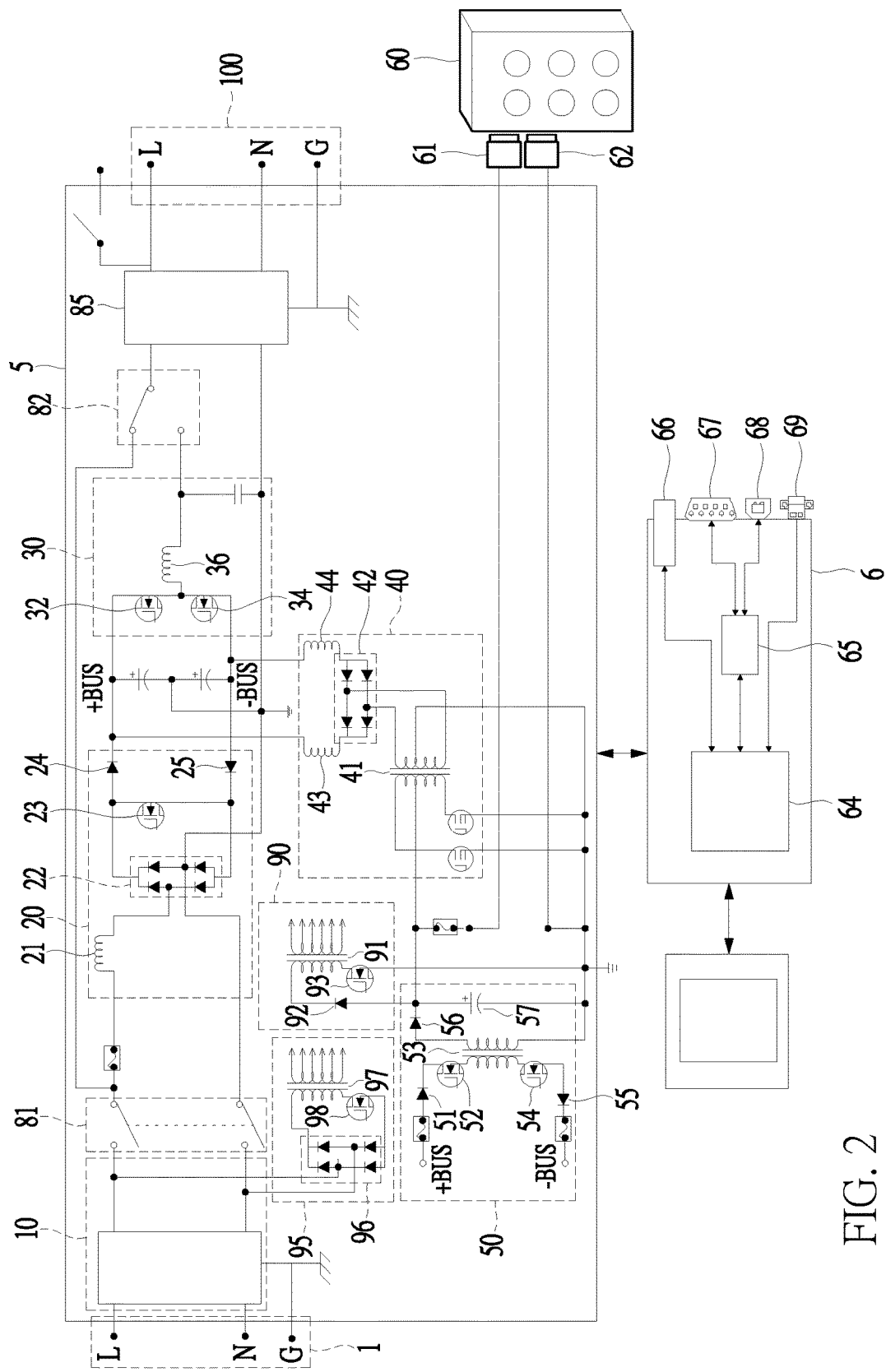
FIG. 2 shows a detailed circuit diagram of an integrated uninterruptible power supply according to an embodiment of the present disclosure.

The present disclosure discloses an integrated uninterruptible power supply which integrates a noise filter, a surge protector and a high voltage circuit breaker, and further integrates a high power charger (e.g., 500-1000 W) in the same circuit board. Therefore, the high power charger includes a high power factor correction function without increasing the size of circuit board. Referring to FIGS. 1 and 2, the integrated uninterruptible power supply in the present disclosure includes a UPS main board 5 that is coupled with a controller 6 and a battery pack 60. The UPS main board 5 includes an AC input 1, a noise filtering surge protecting high voltage circuit breaker 10, a high power factor correction rectifier 20, a DC bus (+BUS, −BUS) 70, an inverter 30, a high power charger 50, a first battery contact 61, a second battery contact 62, a DC/DC convertor 40 and an AC output 100.

Referring to FIG. 1, the AC input 1 is the input of the UPS main board 5. Referring to FIG. 2, the AC input 1 includes a live wire (L), a neutral wire (N) and a ground (G). In practice, the AC input 1 connects to an AC power supply from an electricity company. The noise filtering surge protecting high voltage circuit breaker 10 is coupled with the AC input 1. That is, the noise filtering surge protecting high voltage circuit breaker 10 is disposed at the input of the UPS main board 5. The high power factor correction rectifier 20 is coupled with the noise filtering surge protecting high voltage circuit breaker 10 and outputs a DC. The DC bus 70 is coupled with the high power factor correction rectifier 20 to transmit the DC therefrom. As shown in FIG. 2, the DC bus 70 has a positive terminal (+BUS) and a negative terminal (−BUS). The DC bus 70 transmits the DC from the high power factor correction rectifier 20 to the high power charger 50. The inverter 30 is coupled with the DC bus 70 and converts DC to AC. The high power charger 50 has an input terminal and an output terminal, the input terminal coupled with the DC bus 70. The first battery contact 61 and the second battery contact 62 couple with the output terminal of the high power charger 50 (shown in FIG. 2) and the battery pack 60. The DC/DC convertor 40 is coupled with the first battery contact 61 and the second battery contact 62, and is coupled with the DC bus 70. The AC output 100 is coupled with the inverter 30 as an output of the UPS main board 5. As shown in FIG. 2, the AC output 100 includes a live wire (L), a neutral wire (N) and a ground (G).

The high power charger 50 charges the battery pack 60 using the DC from the high power factor correction rectifier 20 as input so that the high power charger 50 has rectification and high power factor correction functions. Therefore, the present disclosure does not require setting an extra circuit of high power factor correction on the circuit board of the high power battery charger. The controller 6 controls circuits of the UPS main board 5. The power of the high power charger 50 in the present disclosure ranges from 500 W to 1000 W.

FIG. 2 shows a detailed circuit diagram of the high power charger 50. The high power charger 50 includes a first forward-biased diode 51, a first forward-biased switch 52, a second transformer 53, a second forward-biased switch 54, a second forward-biased diode 55, an output diode 56 and an output capacitor 57. The first forward-biased diode 51 has a positive terminal and a negative terminal, and the positive terminal is coupled with the positive terminal (+BUS) of the DC bus 70. The first forward-biased switch 52 has one end coupled with the negative terminal of the first forward-biased diode 51. The second transformer 53 has a primary winding and a secondary winding, with one end of the primary winding coupled with the other end of the first forward-biased switch 52, and one end of the secondary winding coupled to the ground. The second forward-biased switch 54 has one end coupled with the other end of the primary winding of the second transformer 53. The second forward-biased diode 55 has a positive terminal coupled with the other end of the second forward-biased switch 54, and a negative terminal coupled with the negative terminal (−BUS) of the DC bus 70. The output diode 56 has a positive terminal coupled with the other end of the secondary winding of the second transformer 53, and a negative terminal coupled with the first battery contact 61. The output capacitor 57 has one end coupled with the negative terminal of the output diode 56, and the other end coupled to the ground.

The high power factor correction rectifier 20 in FIG. 2 not only conducts an AC-to-DC conversion, but also conducts a high power factor correction. The high power factor correction rectifier 20 includes a first inductor 21, a first rectifier 22, a first switch 23, a first diode 24 and a second diode 25. As shown in FIG. 2, the first inductor 21 has one end coupled with the one end of the output terminal of the noise filtering surge protecting high voltage circuit breaker 10. The first rectifier 22 has an input terminal and an output terminal, with one end of the input terminal coupled with the other end of the first inductor 21, and the other end of the input terminal coupled with the other end of the output terminal noise filtering surge protecting high voltage circuit breaker 10. The first switch 23 has one end coupled with one end of the output terminal of the first rectifier 22, and the other end coupled with the other end of the output terminal of the first rectifier 22. The first diode 24 has a positive terminal coupled with one end of the first switch 23, and a negative terminal coupled with the positive terminal (+BUS) of the DC bus 70. The second diode 25 has a positive terminal coupled with the negative terminal (−BUS) of the DC bus 70, and a negative terminal coupled with the other end of the first switch 23.

The DC/DC converter 40 converts a DC from the battery pack 60, and the inverter 30 converts the DC to an AC, which becomes the output of the integrated uninterruptible power supply. The DC/DC converter 40 includes a first transformer 41, a second rectifier 42, a third inductor 43 and a fourth inductor 44. The first transformer 41 has a primary winding and a secondary winding. One end of the primary winding of the first transformer 41 is coupled with the first battery contact 61. In practice, the first transformer 41 can be, but is not limited to, a center-tapped transformer, and the first transformer 41 and the first battery contact 61 couple together at the center tap. The middle end of the secondary winding of the first transformer 41 is coupled with the second battery contact 62. As shown in FIG. 2, the second battery contact 62 can couple to the ground. The second rectifier 42 has an input terminal and an output terminal, and both ends of the input terminal couple with both ends of the secondary winding of the first transformer. The third inductor 43 has one end coupled with one end of the output terminal of the second rectifier 42 (i.e., the terminal at the left-hand side of the second rectifier 42 in FIG. 2), and the other end coupled with the positive terminal of the DC bus 70 (+BUS). The fourth inductor 44 has one end coupled with the other end of the output terminal of the second rectifier 42 (i.e., the terminal at the right-hand side of the second rectifier 42 in FIG. 2), and the other end coupled with the negative terminal of the DC bus 70 (−BUS).

The inverter 30 in FIG. 2 converts the DC from the high power factor correction rectifier 20 or from the DC/DC converter 40 to an AC, and transmits the AC to the AC output 100 as the output of the integrated uninterruptible power supply. The inverter 30 further includes a second switch 32, a third switch 34 and a second inductor 36. The second switch 32 has one end coupled with the positive terminal of the DC bus 70 (+BUS). The third switch 34 has one end coupled with the other end of the second switch 32, and the other end coupled with the negative terminal of the DC bus 70 (−BUS). The second inductor 36 has one end coupled at a point where the second switch 32 and the third switch 34 couple together, and the other end being the output of the inverter 30 and connecting to the ground via a capacitor (FIG. 2).

In FIG. 2, the controller 6 coupled with the UPS main board 5 controls circuits of all switching elements on the UPS main board 5. The controller 6 further includes a main control unit 64, a USB control unit 65, a main slot 66, a RS232 slot 67, a USB slot 68 and an EPO slot 69. The EPO slot 69 in the present disclosure indicates connection ports employing the e-Policy Orchestrator communication protocol. The main control unit 64 controls the circuits of the UPS main board 5. The USB control unit 65 is coupled with the main control unit 64 and controls the transmission of USB signals. The main slot 66 is for external circuit boards, and is coupled with the main control unit 64. The RS232 slot 67 is for RS232 connectors, and is coupled with the USB control unit 65. The USB slot 68 is for USB connectors, and is coupled with the USB control unit 65. The EPO slot 69 is for EPO connectors, and is coupled with the main control unit 64.

The UPS main board 5 in FIG. 1 further includes a dynamic bypass device 80 for dynamic bypass function. For example, the dynamic bypass device 80 transmits the AC from the AC input 1 to the AC output 100 as an AC output directly through the noise filtering surge protecting high voltage circuit breaker 10. That is, the high power factor correction rectifier 20 and the inverter 30 are bypassed. Referring to FIG. 2, the dynamic bypass device 80 includes an input relay 81, an output relay 82 and an output noise filter 85. The input relay 81 has an input terminal and an output terminal, with the input terminal coupled with the noise filtering surge protecting high voltage circuit breaker 10, and the output terminal coupled with the high power factor correction rectifier 20. The output relay 82 has an input terminal and an output terminal The input terminal of the output relay 82 has a first contact (FIG. 2, the wiring point at the bottom left of the dotted square indicating the output relay 82) and a second contact (FIG. 2, the wiring point at the top left of the dotted square indicating the output relay 82). The first contact of the output relay 82 is coupled with one end of the output terminal of the input relay 81, and the second contact of the output relay 82 is coupled with the end of the second inductor 36 that is the output of the inverter 30.

Referring to FIG. 2, the output noise filter 85 filters the AC from the inverter 30 or from the input relay 81, and removes the noise from the output current. The output noise filter 85 has an input terminal and an output terminal. One end of the input terminal of the output noise filter 85 (FIG. 2, the wiring point at the top left of the square indicating the output noise filter 85) is coupled with the output terminal of the output relay 82, and the other end of the input terminal of the output noise filter 85 is coupled with the other end of the output terminal of the input relay 81 (FIG. 2, the wiring point at the upper part of the dotted square indicating the input relay 81). The output terminal of the output noise filter 85 is coupled with the AC output 100.

The UPS main board 5 further includes a main power supply circuit 90 to supply DC to the electronic components in the UPS main board 5 or the integrated uninterruptible power supply (e.g., IC components in the controller 6). The main power supply circuit 90 includes a third transformer 91, a third forward-biased diode 92, and a third forward-biased switch 93. The third forward-biased diode 92 has a positive terminal and a negative terminal, and the positive terminal is coupled with the output terminal of the high power charger 50. The third transformer 91 has a primary winding and a secondary winding, with one end of the primary winding coupled with the negative terminal of the third forward-biased diode 92 and the secondary winding having multiple power outputs. The third forward-biased switch 93 has one end coupled with the other end of the primary winding of the third transformer 91, and the other end coupled to the ground.

The UPS main board further includes an auxiliary power supply circuit 95 to rectify the AC from the noise filtering surge protecting high voltage circuit breaker 10 and supply multiple auxiliary DC to the electronic components in the UPS main board 5 or the integrated uninterruptible power supply. The auxiliary power supply circuit 95 includes a third rectifier 96, a fourth transformer 97 and a fourth forward-biased switch 98. The third rectifier 96 has an input terminal and an output terminal, the input terminal coupled with the noise filtering surge protecting high voltage circuit breaker 10. The fourth transformer has a primary winding and a secondary winding, with one end of a primary winding coupled with one end of the output terminal of the third rectifier 96, and the secondary winding having multiple power outputs. The fourth forward-biased switch 98 has one end coupled with the other end of the primary winding of the fourth transformer 97, and the other end coupled with the other end of the output terminal of the third rectifier 96.

The advantages of the present disclosure include:

The high power charger 50 shares the same circuit with the high power factor correction rectifier 20 so that the charging capacity can outperform the 500 W in conventional UPS products and reach 1000 W.

The total harmonic distortion during charging is reduced from >25% to <6%, and the input power factor is increased from <0.9% to >0.99%. Therefore, the harmonic pollution to the power supply system is reduced.

The ripple in charging current is reduced from >85% to <13%. Therefore, the battery life, battery charging capacity and battery charging efficiency are increased, and the charging time is shortened.

The number of circuit boards on the UPS main circuit board is reduced. In addition, the present disclosure integrates the high voltage circuit breaker and the high power charger in the same circuit board, so that the reliability is increased and the cost is decreased. Meanwhile, the present disclosure has superior input characteristics and increases the UPS efficiency by 3-4%.

In summary, the present disclosure discloses an integrated uninterruptible power supply, which does not require setting an extra circuit of high power factor correction on the circuit board of the high power battery charger. Therefore, the present disclosure lowers the material and production costs of UPS products, and decreases the size of the circuit board.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. An integrated uninterruptible power supply, comprising:
    a UPS main board coupled with a controller and a battery pack, including
        an AC input being an input of the UPS main board;
        a noise filtering surge protecting high voltage circuit breaker coupled with the AC input;
        a high power factor correction rectifier coupled with the noise filtering surge protecting high voltage circuit breaker and outputting a DC;
        a DC bus having a positive terminal and a negative terminal, and coupled with the high power factor correction rectifier to transmit the DC therefrom;
        an inverter coupled with the DC bus;
        a high power charger having an input terminal and an output terminal, and the input terminal coupled with the DC bus;
        a first battery contact coupled with the output terminal of the high power charger and the battery pack;
        a second battery contact coupled with the output terminal of the high power charger and the battery pack;
        a DC/DC convertor coupled with the first battery contact and the second battery contact, and coupled with the DC bus; and
        an AC output coupled with the inverter as an output of the UPS main board;
        wherein the high power charger charges the battery pack using the DC from the high power factor correction rectifier as input so that the high power charger has rectification and high power factor correction functions;
        wherein the controller controls circuits of the UPS main board.

2. The integrated uninterruptible power supply according to claim 1, wherein the high power charger further includes
    a first forward-biased diode having a positive terminal and a negative terminal, and the positive terminal coupled with the positive terminal of the DC bus;
    a first forward-biased switch, and one end of the first forward-biased switch coupled with the negative terminal of the first forward-biased diode;
    a second transformer, one end of a primary winding of the second transformer coupled with the other end of the first forward-biased switch, and one end of a secondary winding of the second transformer coupled to the ground;
    a second forward-biased switch, and one end of the second forward-biased switch coupled with the other end of the primary winding of the second transformer;
    a second forward-biased diode having a positive terminal coupled with the other end of the second forward-biased switch, and a negative terminal coupled with the negative terminal of the DC bus;

an output diode having a positive terminal coupled with the other end of the secondary winding of the second transformer, and a negative terminal coupled with the first battery contact; and an output capacitor having one end coupled with the negative terminal of the output diode, and the other end coupled to the ground;

wherein the power of the high power charger ranges from 500 W to 1000 W.

3. The integrated uninterruptible power supply according to claim 1, wherein the high power factor correction rectifier further includes a first inductor, and one end of the first inductor coupled with one end of an output terminal of the noise filtering surge protecting high voltage circuit breaker;

a first rectifier having an input terminal and an output terminal, one end of the input terminal of the first rectifier coupled with the other end of the first inductor, and the other end of the input terminal of the first rectifier coupled with the other end of the output terminal of the noise filtering surge protecting high voltage circuit breaker;

a first switch having one end coupled with one end of the output terminal of the first rectifier, and the other end coupled with the other end of the output terminal of the first rectifier;

a first diode having a positive terminal coupled with one end of the first switch, and a negative terminal coupled with the positive terminal of the DC bus;

a second diode having a positive terminal coupled with the negative terminal of the DC bus, and a negative terminal coupled with the other end of the first switch.

4. The integrated uninterruptible power supply according to claim 1, wherein the DC/DC converter further includes a first transformer, one end of a primary winding of the first transformer coupled with the first battery contact, and a middle end of a secondary winding of the first transformer coupled with the second battery contact;

a second rectifier having an input terminal and an output terminal, both ends of the input terminal of the second rectifier coupled with both ends of the secondary winding of the first transformer;

a third inductor having one end coupled with one end of the output terminal of the second rectifier, and the other end coupled with the positive terminal of the DC bus; and a fourth inductor having one end coupled with the other end of the output terminal of the second rectifier, and the other end coupled with the negative terminal of the DC bus.

5. The integrated uninterruptible power supply according to claim 1, wherein the inverter further includes a second switch, and one end of the second switch coupled with the positive terminal of the DC bus;

a third switch having one end coupled with the other end of the second switch, and the other end coupled with the negative terminal of the DC bus; and a second inductor having one end coupled at a point where the second switch and the third switch couple together, and the other end being the output of the inverter.

6. The integrated uninterruptible power supply according to claim 1, wherein the controller further includes a main control unit controlling circuits of the UPS main board;

a USB control unit coupled with the main control unit and controlling transmission of USB signals;

a main slot for external circuit boards, coupled with the main control unit;

a RS232 slot for RS232 connectors, coupled with the USB control unit;

a USB slot for USB connectors, coupled with the USB control unit; and an EPO slot for EPO connectors, coupled with the main control unit.

7. The integrated uninterruptible power supply according to claim 1, wherein the UPS main board further includes a dynamic bypass device having an input relay having an input terminal coupled with the noise filtering surge protecting high voltage circuit breaker, and an output terminal coupled with the high power factor correction rectifier; and an output relay having an input terminal and an output terminal, the input terminal of the output relay having a first contact and a second contact, the first contact coupled with one end of the output terminal of the input relay, and the second contact coupled with the inverter.

8. The integrated uninterruptible power supply according to claim 7, wherein the dynamic bypass device further includes an output noise filter having an input terminal and an output terminal, one end of the input terminal of the output noise filter coupled with the output terminal of the output relay, and the other end of the input terminal of the output noise filter coupled with the other end of the output terminal of the input relay.

9. The integrated uninterruptible power supply according to claim 1, wherein the UPS main board further includes a main power supply circuit having a third forward-biased diode having a positive terminal and a negative terminal, the positive terminal coupled with the output terminal of the high power charger;

a third transformer, one end of a primary winding of the third transformer coupled with the negative terminal of the third forward-biased diode, and a secondary winding of the third transformer having multiple power outputs; and a third forward-biased switch having one end coupled with the other end of the primary winding of the third transformer, and the other end coupled to the ground.

10. The integrated uninterruptible power supply according to claim 1, wherein the UPS main board further includes an auxiliary power supply circuit having a third rectifier having an input terminal and an output terminal, the input terminal of the third rectifier coupled with the noise filtering surge protecting high voltage circuit breaker;

a fourth transformer, one end of a primary winding of the fourth transformer coupled with one end of the output terminal of the third rectifier, and a secondary winding of the fourth transformer having multiple power outputs; and a fourth forward-biased switch having one end coupled with the other end of the primary winding of the fourth transformer, and the other end coupled with the other end of the output terminal of the third rectifier.

* * * * *